United States Patent
Geiger (10) Patent No.: US 9,519,917 B2
(45) Date of Patent: Dec. 13, 2016

(54) CONTEXT-BASED ADVERTISING (71) Applicant: eBay Inc., San Jose, CA (US)

(72) Inventor: Thomas Geiger, Leimen (DE)

(73) Assignee: eBay Inc., San Jose, CA (US)

(*) Notice: Subject to any disclaimer, the term of this patent is extended or adjusted under 35 U.S.C. 154(b) by 230 days.

(21) Appl. No.: 14/557,173

(22) Filed: Dec. 1, 2014

(65) Prior Publication Data

US 2015/0088651 A1 Mar. 26, 2015

Related U.S. Application Data (63) Continuation of application No. 11/945,380, filed on Nov. 27, 2007, now abandoned.

(51) Int. Cl.
G06Q 30/02 (2012.01)
G06F 17/27 (2006.01)

(52) U.S. Cl.
CPC ........... *G06Q 30/0256* (2013.01); *G06F 17/27* (2013.01); *G06Q 30/02* (2013.01)

(58) Field of Classification Search
CPC .. G06Q 30/0241; G06Q 30/0256; G06F 17/27
See application file for complete search history.

(56) References Cited

U.S. PATENT DOCUMENTS

| | | | |
|---|---|---|---|
| 5,526,443 A * | 6/1996 | Nakayama | 382/229 |
| 5,630,114 A | 5/1997 | Serra et al. | |
| 5,873,107 A | 2/1999 | Borovoy et al. | |
| 6,002,998 A * | 12/1999 | Martino et al. | 704/9 |
| 6,023,670 A | 2/2000 | Martino et al. | |
| 6,249,882 B1 | 6/2001 | Testardi | |
| 6,446,036 B1 | 9/2002 | Bourbonnais et al. | |
| 6,484,161 B1 * | 11/2002 | Chipalkatti et al. | |
| 6,845,369 B1 | 1/2005 | Rodenburg | |
| 7,069,271 B1 | 6/2006 | Fadel et al. | |
| 7,100,109 B1 | 8/2006 | Chartier | |
| 7,200,637 B2 | 4/2007 | Klos et al. | |
| 7,304,984 B2 | 12/2007 | Butler et al. | |
| 7,310,633 B1 | 12/2007 | Wang et al. | |
| 7,483,891 B2 | 1/2009 | Liu et al. | |
| 7,503,000 B1 * | 3/2009 | Kreulen et al. | 715/259 |

(Continued)

FOREIGN PATENT DOCUMENTS

WO WO-2004030338 A2 4/2004

OTHER PUBLICATIONS

"U.S. Appl. No. 11/945,380, Examiner Interview Summary mailed Aug. 5, 2010", 14 pgs.

(Continued)

*Primary Examiner* — Robert R Niquette
(74) *Attorney, Agent, or Firm* — Schwegman, Lundberg & Woessner, P.A.

(57) ABSTRACT

A method and a system for context-based real-time advertising are provided. In example embodiments, a document content that is displayed to a user may be analyzed and keywords may be identified. Selected listings from a publication system may be received; the selected listings may be selected using the keywords. The system may detect user events associated with the keywords and, in response to the detection of the user events, display information related to the listings while maintaining the displaying of the document content.

9 Claims, 12 Drawing Sheets

(56) References Cited

U.S. PATENT DOCUMENTS

| | | | |
|---|---|---|---|
| 7,610,546 B1 | 10/2009 | Nagao et al. | |
| 7,735,018 B2 | 6/2010 | Bakhash | |
| 7,742,953 B2* | 6/2010 | King et al. | 705/26.1 |
| 7,934,206 B2 | 4/2011 | Butler et al. | |
| 7,975,019 B1* | 7/2011 | Green | G06Q 30/0241 705/14.4 |
| 8,335,719 B1* | 12/2012 | Quraishi | G06Q 30/0241 705/14.49 |
| 8,849,945 B1* | 9/2014 | Desjardins et al. | 709/217 |
| 2001/0052111 A1 | 12/2001 | Scott | |
| 2002/0042750 A1* | 4/2002 | Morrison | 705/26 |
| 2005/0015449 A1 | 1/2005 | Klos et al. | |
| 2005/0033641 A1* | 2/2005 | Jha et al. | 705/14 |
| 2005/0071319 A1* | 3/2005 | Kelley et al. | 707/3 |
| 2005/0076051 A1* | 4/2005 | Carobus et al. | 707/102 |
| 2005/0137939 A1* | 6/2005 | Calabria | G06Q 30/0601 705/26.1 |
| 2006/0136372 A1 | 6/2006 | Schunemann | |
| 2006/0173839 A1 | 8/2006 | Knepper et al. | |
| 2006/0212353 A1* | 9/2006 | Roslov | G06Q 30/02 705/14.54 |
| 2006/0253437 A1 | 11/2006 | Fain et al. | |
| 2007/0035780 A1 | 2/2007 | Kanno | |
| 2007/0061487 A1 | 3/2007 | Moore et al. | |
| 2007/0073756 A1 | 3/2007 | Manhas et al. | |
| 2007/0143432 A1 | 6/2007 | Klos et al. | |
| 2007/0185841 A1 | 8/2007 | Jones et al. | |
| 2007/0219940 A1 | 9/2007 | Mueller et al. | |
| 2007/0282825 A1* | 12/2007 | Toub | 707/5 |
| 2008/0010112 A1* | 1/2008 | Kniaz et al. | 705/14 |
| 2008/0059526 A1 | 3/2008 | Murakoshi | |
| 2008/0065471 A1 | 3/2008 | Reynolds et al. | |
| 2008/0097830 A1* | 4/2008 | Kim | 705/10 |
| 2008/0097958 A1 | 4/2008 | Ntoulas et al. | |
| 2008/0155338 A1 | 6/2008 | Rusmanov | |
| 2008/0228720 A1 | 9/2008 | Mukherjee et al. | |
| 2008/0300872 A1 | 12/2008 | Basu et al. | |
| 2009/0011781 A1* | 1/2009 | Merrill et al. | 455/466 |
| 2009/0034881 A1* | 2/2009 | Lapstun et al. | 382/321 |
| 2009/0094105 A1* | 4/2009 | Gounares | G06Q 30/0273 705/14.69 |
| 2009/0099902 A1* | 4/2009 | Chatter et al. | 705/10 |
| 2009/0265243 A1* | 10/2009 | Karassner et al. | 705/14.54 |
| 2009/0276467 A1* | 11/2009 | Scholtes et al. | 707/200 |
| 2009/0300496 A1* | 12/2009 | Fan et al. | 715/711 |
| 2010/0005096 A1 | 1/2010 | Minagawa et al. | |
| 2010/0153219 A1 | 6/2010 | Mei et al. | |
| 2011/0295612 A1 | 12/2011 | Donneau-golencer et al. | |

OTHER PUBLICATIONS

"U.S. Appl. No. 11/945,380, Final Office Action mailed Jan. 17, 2012", 22 pgs.

"U.S. Appl. No. 11/945,380, Final Office Action mailed Feb. 7, 2013", 34 pgs.

"U.S. Appl. No. 11/945,380, Final Office Action mailed Feb. 11, 2014", 21 pgs.

"U.S. Appl. No. 11/945,380, Final Office Action mailed Dec. 30, 2010", 26 pgs.

"U.S. Appl. No. 11/945,380, Non Final Office Action mailed May 9, 2013", 19 pgs.

"U.S. Appl. No. 11/945,380, Non Final Office Action mailed Aug. 31, 2011", 21 pgs.

"U.S. Appl. No. 11/945,380, Non Final Office Action mailed Oct. 12, 2012", 20 pgs.

"U.S. Appl. No. 11/945,380, Non-Final Office Action mailed Aug. 20, 2010", 23 pgs.

"U.S. Appl. No. 11/945,380, Notice of Non-Responsive Amendment mailed Oct. 1, 2014", 7 pgs.

"U.S. Appl. No. 11/945,380, Preliminary Amendment filed Aug. 5, 2010", 14 pgs.

"U.S. Appl. No. 11/945,380, Response filed Jan. 3, 2013 to Non Final Office Action mailed Oct. 12, 2012", 14 pgs.

"U.S. Appl. No. 11/945,380, Response filed Mar. 1, 2011 to Final Office Action mailed Dec. 30, 2010", 20 pgs.

"U.S. Appl. No. 11/945,380, Response filed Mar. 6, 2012 to Final Office Action mailed Jan. 17, 2012", 24 pgs.

"U.S. Appl. No. 11/945,380, Response filed Jul. 30, 2013 to Non Final Office Action mailed May 30, 2013", 19 pgs.

"U.S. Appl. No. 11/945,380, Response filed Aug. 11, 2014 to Final Office Action mailed Feb. 11, 2014", 20 pgs.

"U.S. Appl. No. 11/945,380, Response filed Nov. 21, 2011 to Non Final Office Action mailed Aug. 31, 2011", 13 pgs.

"U.S. Appl. No. 11/945,380, Response filed Nov. 22, 2010 to Non Final Office Action mailed Aug. 20, 2010", 19 pgs.

"U.S. Appl. No. 12/463,121 , Response filed Apr. 19, 2013 to Final Office Action mailed Feb. 7, 2013", 20 pgs.

"Experiments on Automatic Web Page Categorization for IR system Hisao Mase", (1998), 12 pgs.

Robbins, Arnold, et al., "Unix in a nutshell", 3rd edition, O'Reily & Associates, Inc, (Aug. 1999), 215-221 and 265-266 pgs.

* cited by examiner

CONTEXT-BASED ADVERTISING

RELATED APPLICATION

This application is a continuation of U.S. patent application Ser. No. 11/945,380, filed Nov. 27, 2007, the benefit of priority of which is claimed hereby, and which is incorporated herein by reference in its entirety.

TECHNICAL FIELD

Example embodiments relate generally to the technical field of data management, and in one specific example, to context-based real-time advertising.

BACKGROUND

Advertising is one of the most important business activities of almost all business entities such as corporations, companies, institutions and the like. The widespread use of the Internet has provided an efficient and low-cost platform for advertising. Advertisers may readily select the target consumers for their products or services based on geographic or demographic distributions or other criteria. Many Website owners may benefit from monetizing their Websites by showing advertisements that result in receiving incentives from the advertisers.

BRIEF DESCRIPTION OF THE DRAWINGS

Some embodiments are illustrated by way of example and not limitation in the figures of the accompanying drawings in which.

DETAILED DESCRIPTION

Example methods and systems for context-based real-time advertising have been described. In the following description, for purposes of explanation, numerous specific details are set forth to provide a thorough understanding of example embodiments. It will be evident, however, to one skilled in the art that the present invention may be practiced without these specific details.

For the purpose of present application, the term "context-linking" shall be taken to include, but not be limited to, linking some selected keywords or features from the content of an online document, such as a Web page to a specific advertisement (e.g. linking a keyword to a listing in a commerce system).

Some embodiments described herein may include a computerized method for analyzing a document content that is displayed to a user and identifying keywords. Selected listings from a publication system may be received; the selected listings may be selected using the keywords. According to the method, user events associated with the keywords may be detected and, in response to the detection of the user events, information related to the listings may be displayed, while maintaining the displaying of the document content.

Figure 1:
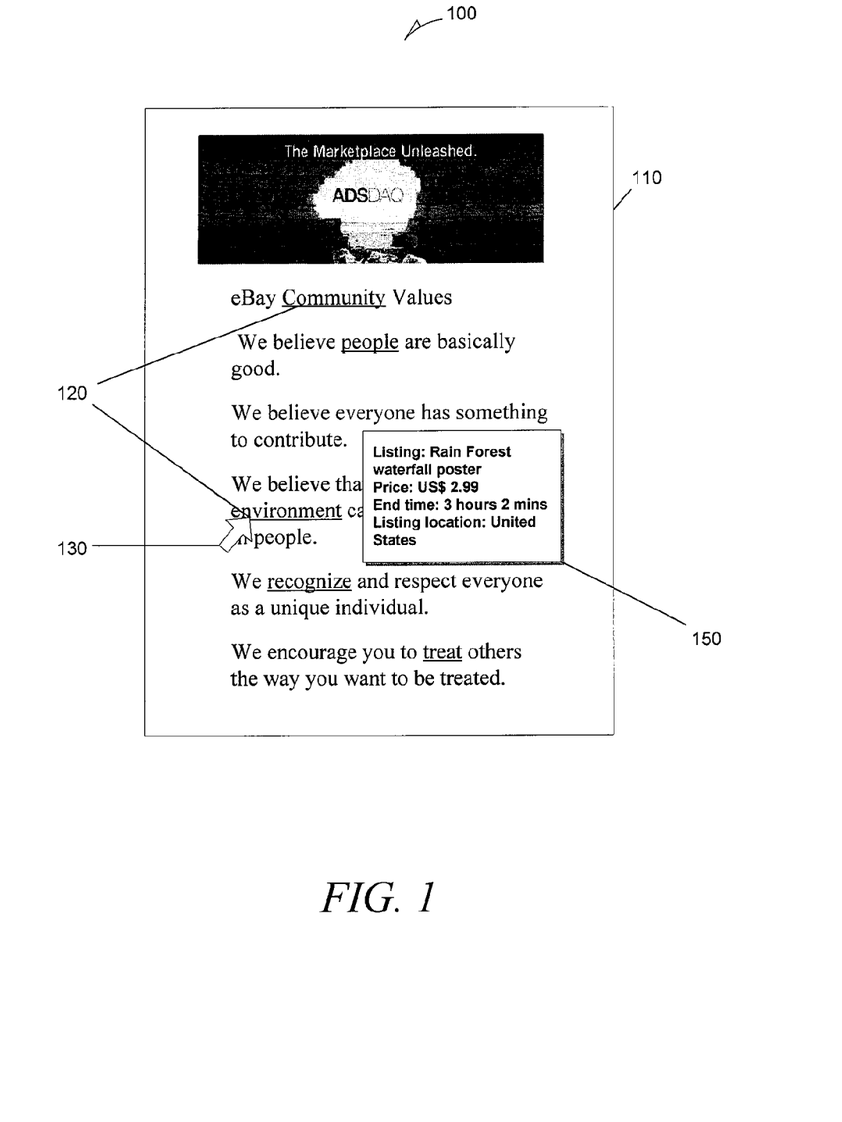
FIG. 1 is a high-level diagram illustrating, in an example embodiment, functionality of a context-based real-time advertising system.

FIG. 1 is a high-level diagram 100 illustrating, in an example embodiment, functionality of a context-based real-time advertising system. The diagram 100 shows an example document 110 (e.g., an online document or a Web page) linked to a publication data in a publication system (e.g., a listing or other publication of a commerce system). The content of the document 110 is analyzed to identify highlighted keywords 120 (e.g., underlined words "Community," "people," "environment," "recognize," and "treat," hereinafter called "contextual-keywords"). The keywords 120 may be linked to listings from a publication system that may be related to a respective keyword 120.

Whenever a user event (e.g., mouse over or mouse click) occurs with respect any of the keywords 120, the event may be automatically detected. The detection of the user event may cause the system to display information related to the listing. In the example embodiment shown in FIG. 1, the user event is symbolically shown by a pointer 130 tagging one of the keywords 120 (e.g., the word "environment"). Once the user event is automatically detected by the context-based real-time advertising system, the system may display a tooltip window 150. The tooltip window 150 may display information related to a listing selected from a publication system using the keyword "environment." The example listing displayed in tooltip window 150 is a Rain Forest Waterfall poster, for which the related information such as price, auction end-time, and listing location are displayed.

The displaying of the information (e.g., by the tooltip window 150), as shown in FIG. 1, may occur while the displaying of the content of the document 110 is maintained, in an alternative example embodiment, the tooltip window 150 may be shown on selected areas of the document, or in a dedicated section of a user interface within which the document 110 is displayed.

In an example embodiment, the owner of the document 110 may be an affiliate of the publication system. The owner may want to monetize his document and receive a commission whenever the user registers as a customer or initiates a certain activity, e.g., places a bid, within the publication system after clicking on a contextual-keyword 120. The owner of the document may also be the one who decides about the content of the tooltip window 150 (e.g., the type of listing related information to be displayed by the tooltip window).

Figure 2:
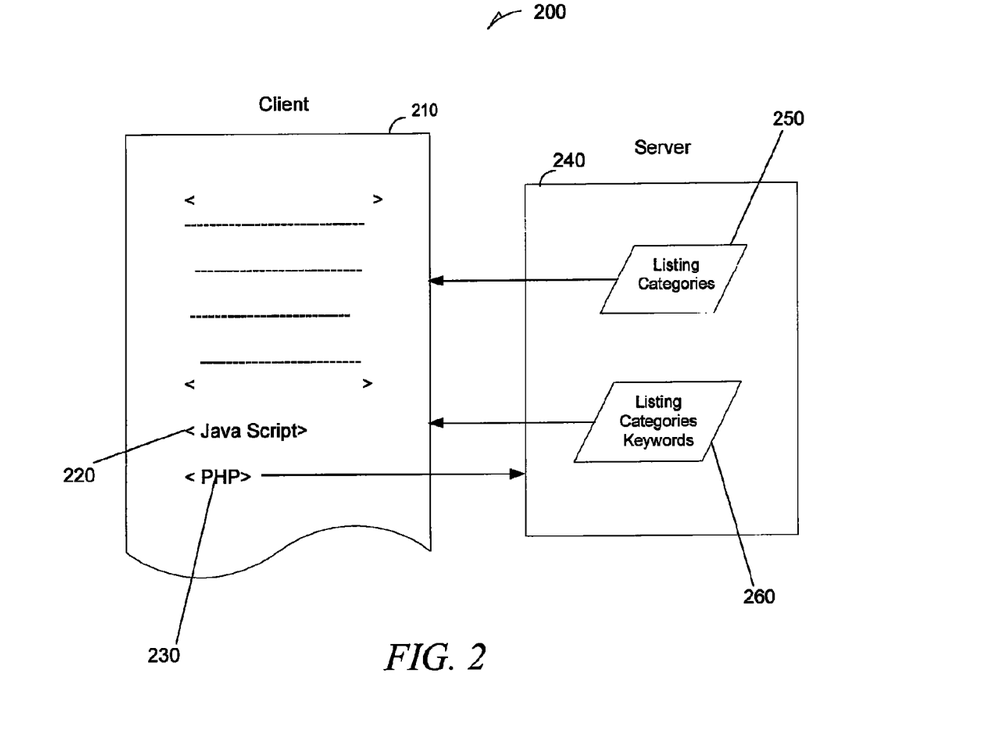
FIG. 2 is a high-level diagram illustrating, in an example embodiment, a client-server functionality of a context-based real-time advertising system.

FIG. 2 is a high-level diagram illustrating, in an example embodiment, client-server functionality of a context-based real-time advertising system 200. On a client side, a document 210, displayed on a client machine may be modified to include a Java Script (JS) 220 and PHP 230 (PHP is a recursive acronym for PHP: Hypertext Preprocessor) program. The owner of this document (e.g., an affiliate of a publication system) may make a request to a publication system (e.g., in a commerce system), that the document 210 be considered for context-linking to the data published by the publication system. The document owner, in response to the request, may receive a JS 220 and a PUP 230 from the publication system and embed the 220 and PHP 230 in the document 210.

According to an example embodiment, the PHP 230 may make an Application Programming Interface (API) call to the server 240 of the publication system to initiate the analysis of the document 210. The analyzing of the document may include parsing the document, removing Hyper Text Markup Language (HTML) tags, identifying the language of the text content of the document, and identifying a selected group of words. Once the selected words are identified, the listing categories 250 that are most related to those selected group of words are selected and listing category keywords 260 are identified. The listing category keywords 260 may be used, as described in FIG. 5, to identify the keywords 120 within the content of the document 210. Once identified, the keywords 120 may be highlighted by execution of the IS 220. The highlighting may include underlining or changing the color of the characters of the keywords 120.

Figure 3:
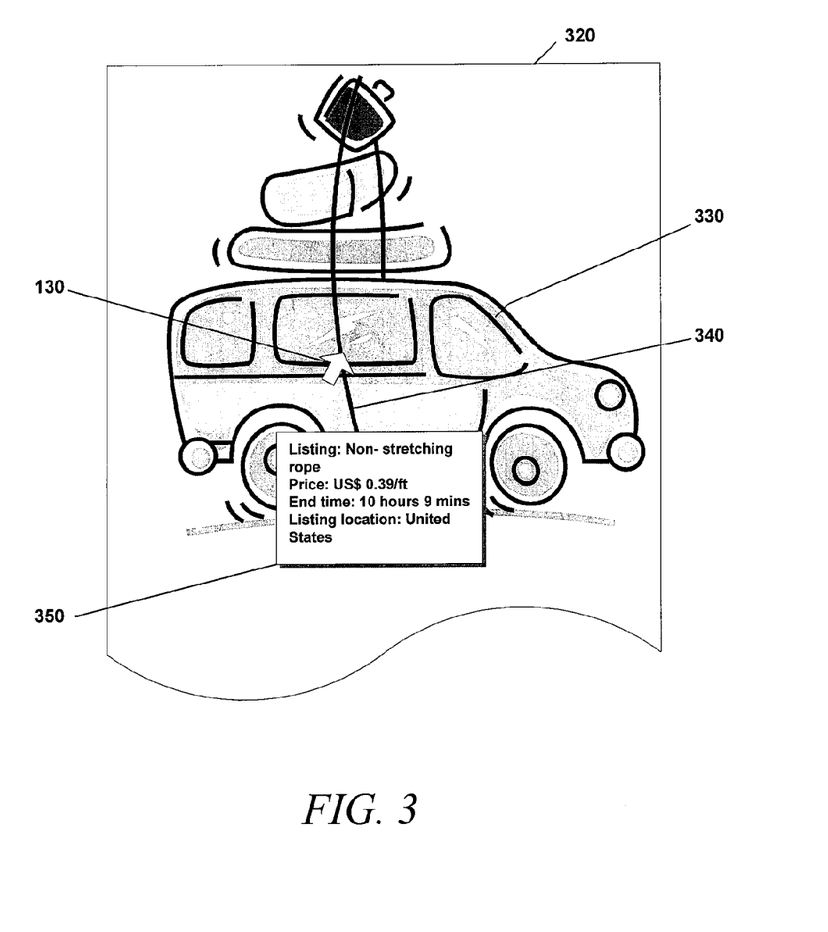
FIG. 3 is a diagram illustrating, in an another example embodiment, functionality of a context-based real-time advertising system.

FIG. 3 is a diagram illustrating, in an another example embodiment, functionality of a context-based real-time advertising system. In this example embodiment, the document 320 displayed to a user may include an image 330, e.g., a van, including a key-feature 340, e.g., a rope, tagged with the pointer 130. The pointer 130 may signify that a user event (e.g., a mouse click, mouse over, or the like) associated with the key-feature 340 has been automatically detected. According to the example embodiment, once the user event is detected, a tooltip window 350 may be displayed. The tooltip window 350 may include information associated with a listing in a publication system relating to the key-feature 340.

In an example embodiments, the type of listing information relating to a key-feature of the document 320, e.g., key-feature 340, displayed in a tooltip window, e.g., tooltip window 350, may be selected by the owner of the document 320. The owner of the document 320 may receive executable codes from the publication system to be embedded in the document 320. Upon execution, the embedded codes may cause an application running on a server of the publication system to identify key-features of the images of the document 320. The embedded codes, upon execution, may also cause the server to link the key-features of the images of the document 320 to publication data from the publication system (e.g., listings or other publication from a commerce system) related to the key-features. The linking of a key-feature may include displaying a related listing to the key-feature, in response to an user event associated with that key-feature.

Figure 4:
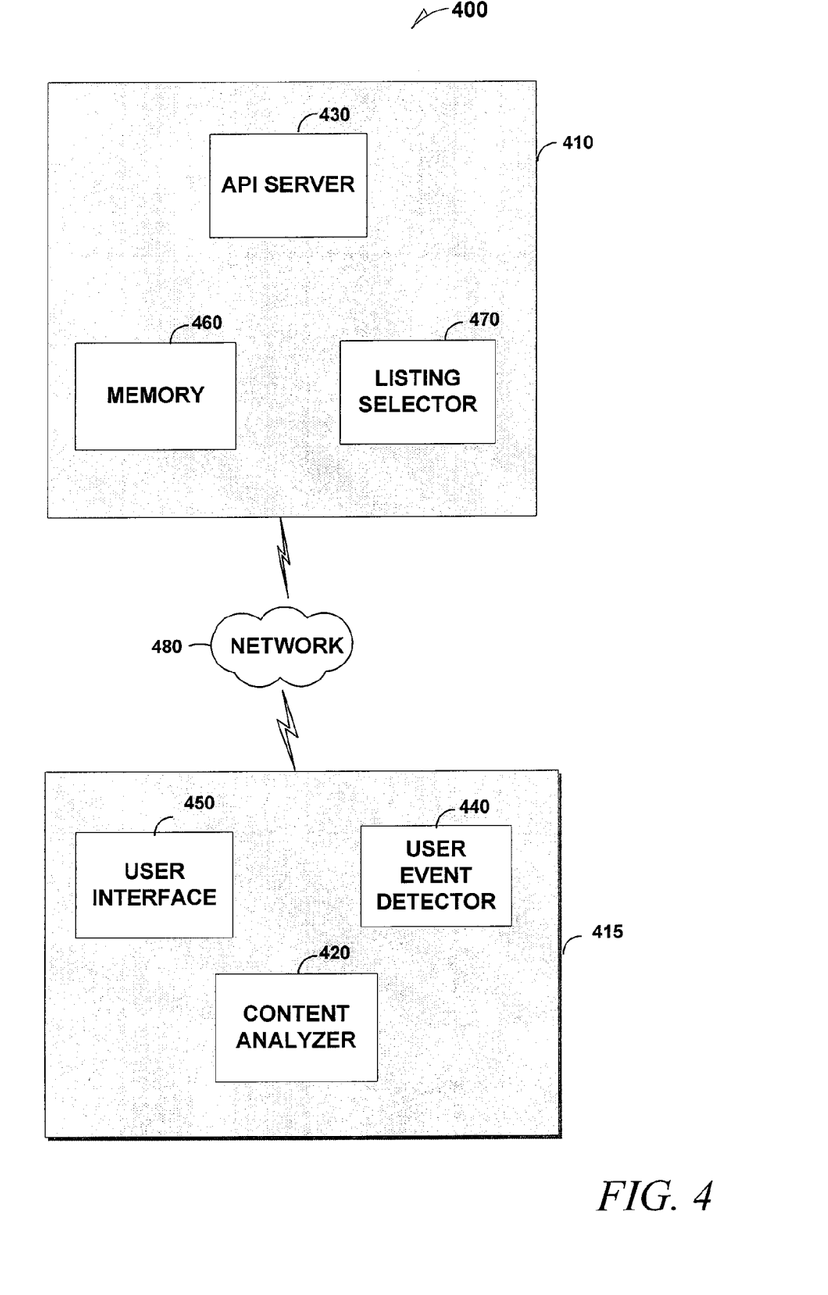
FIG. 4 is a block diagram illustrating, in an example embodiment, a context-based real-time advertising system.

FIG. 4 is a block diagram illustrating, in an example embodiment, a context-based real-time advertising system 400. The context-based real-time advertising system 400 may include a server 410 and a client machine 415. The server 410 may include an API server 430, a memory 460, and a listing selector 470. According to an example embodiment, the server 410 may be coupled, via a network 480, to the client machine 415 displaying a document 210. The client machine 415 may include a user interface 450, a user event detector 440, and a content analyzer 420.

In example embodiments, the content analyzer 420 may analyze the content of the document 210 to identify contextual-keywords. The content analyzer may initiate the analysis of the document 210, in response to a call to the API server 430 from the client machine 415. The listing selector 470 may select a listing from a publication system, using the keywords. The API server may also facilitate receiving the selected listing from the publication system. The user interface, 450 may provide the client machine 415 with user interfaces that may display information related to the listing, in response to detection by the user event detector 440, of a user event (e.g., a mouse over, a mouse click, or the like) associated with the keywords.

According to example embodiments, the content analyzer 420 may detect the language of the content of the document 210. The detection of the language may be performed by a series of operations including parsing the content, removing HTML, tags, and counting the occurrence frequency of all words within the content. The result of such counting may be a list of words followed by a number indicating a frequency associated with each word. By comparing a top group of most frequently occurring words, e.g., a top-20 words, of the document with top groups of words associated with various languages, a good match may be found with a specific language. Other methods of identifying the language of the content may also be used. The content analyzer 420 may then remove determined words, such as is, are, it, that, this, etc. from the content and generate filtered content. The content analyzer 420 may then identify the top-n word from the filtered content. The top-n words may include a predefine number n, e.g., 20, of the most frequently used words in the filtered content. The top-n words may be stored in a memory 460.

In example embodiments, the listing selector 470 may use the top-n words to identify a top-m publication categories in the publication system. The top-m publication categories may include a predefined number m, e.g., 20, of the categories showing the highest probability of containing, or being otherwise associated with the top-n words. The listing selector 470 may then retrieve a list of keywords associated with the top-m listing categories from the memory 460. The content analyzer 420 may then compare the words in the filtered content with the retrieved list of keywords and identify any word from the filtered content that also exists in the list of keywords as the contextual-keywords.

The contextual-keywords may be highlighted in the document 210 and the content analyzer 420 may store the contextual-keywords and the information related to listings associated with the contextual-keywords in the memory 460.

Figure 5:
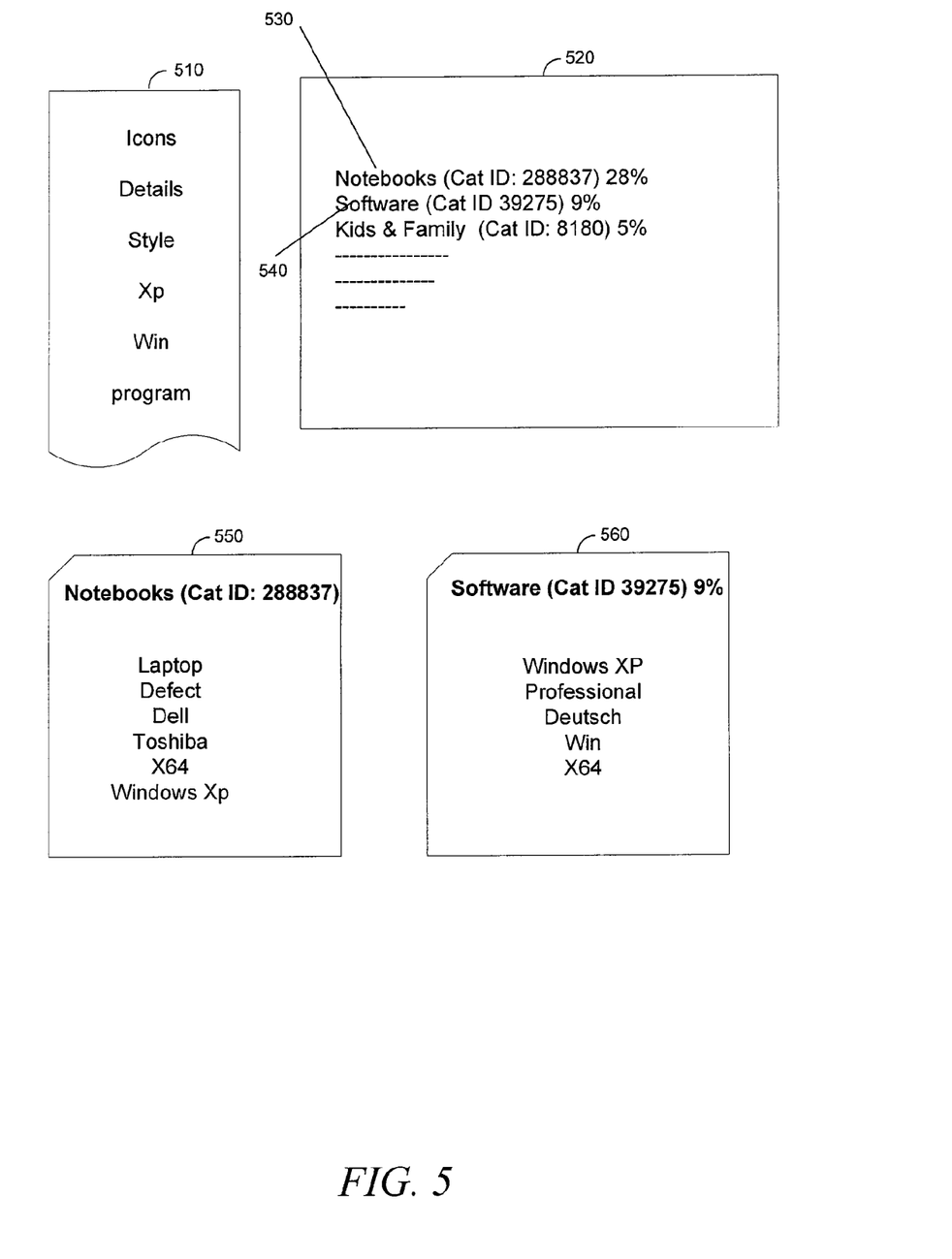
FIG. 5 is a diagram illustrating, in an example embodiment, an operational view of a context-based real-time advertising system.

FIG. 5 is a diagram illustrating, in an example embodiment, an operational view of a context-based real-time advertising system. A list 510 shows the top-6 words generated by the content analyzer 420 from example filtered content of a document, e.g. document 210. The top-6 words may be used by the listing selector 470 to identify the top-m categories of listings in a publication system, shown in a box 520. The categories are listed in a descending order by probabilities of containing the top-6 words of the list 510 by the publication data in the categories. For example the publication data in the categories notebook, software, and kids & family show the highest probability of containing the words of the list 510. The probabilities are shown to be 28%, 9%, and 5%, respectively.

According to example embodiments, in a next operation, the listing selector 470 may find the keywords listed by the publication system for the top-m categories. In the example shown, the selected (e.g., most frequent) keywords for categories notebook and software are shown in lists 550 and 560, respectively. In a next operation the content analyzer 420 may compare the words of the list 510 with the keywords shown in lists 550 and 560 to identify the words that are also present in the keywords. These words are defined to constitute context words of the document. In this particular example, the words Xp and Win may be selected as the contextual-keywords.

Figure 6:
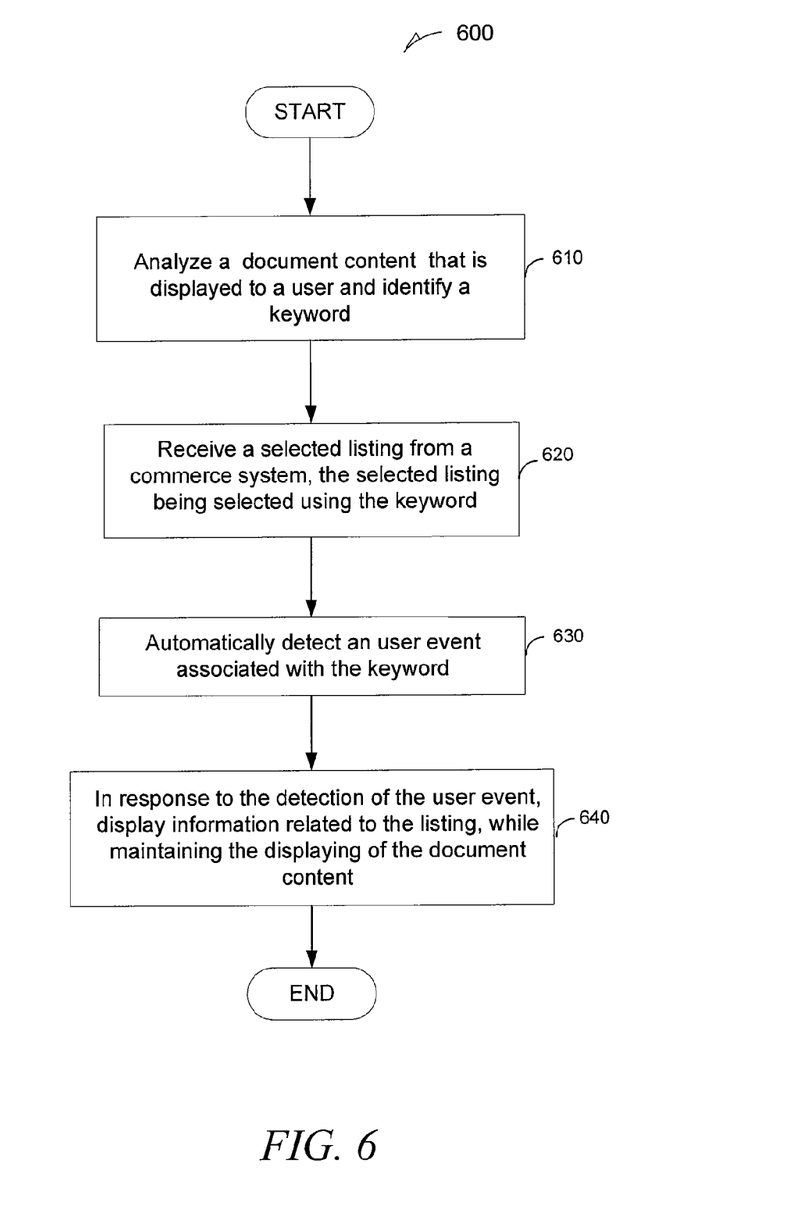
FIG. 6 is a flow diagram illustrating an example embodiment of a method for context-based real-time advertising.

FIG. 6 is a flow diagram illustrating an example embodiment of a method 600 for context-based real-time advertising. The method 600 starts at operation 610, where the content analyzer 420 may analyze document 210 that is displayed to a user and identifies contextual-keywords for the document 210. At operation 620, the API server 430 may retrieve a selected publication data (e.g., listing) from a publication system; the selected listing may be selected by the listing selector 470, using the contextual-keywords, as discussed in the descriptions of FIGS. 4 and 5.

The user event detector 440, at operation 630, may automatically detect a user event (e.g., mouse click, mouse over, or the like) associated with a contextual-keyword. Once such a user event is detected, at operation 640, the user interface 450 may display information related to a listing associated with the contextual-keyword. The displaying of the information may include showing a tooltip window. The showing of the tooltip window may occur white maintaining the display of the document 210. In an example embodiment, the tooltip window may be displayed in a dedicated section of a user interface within which the document 210 is displayed.

Figure 7:
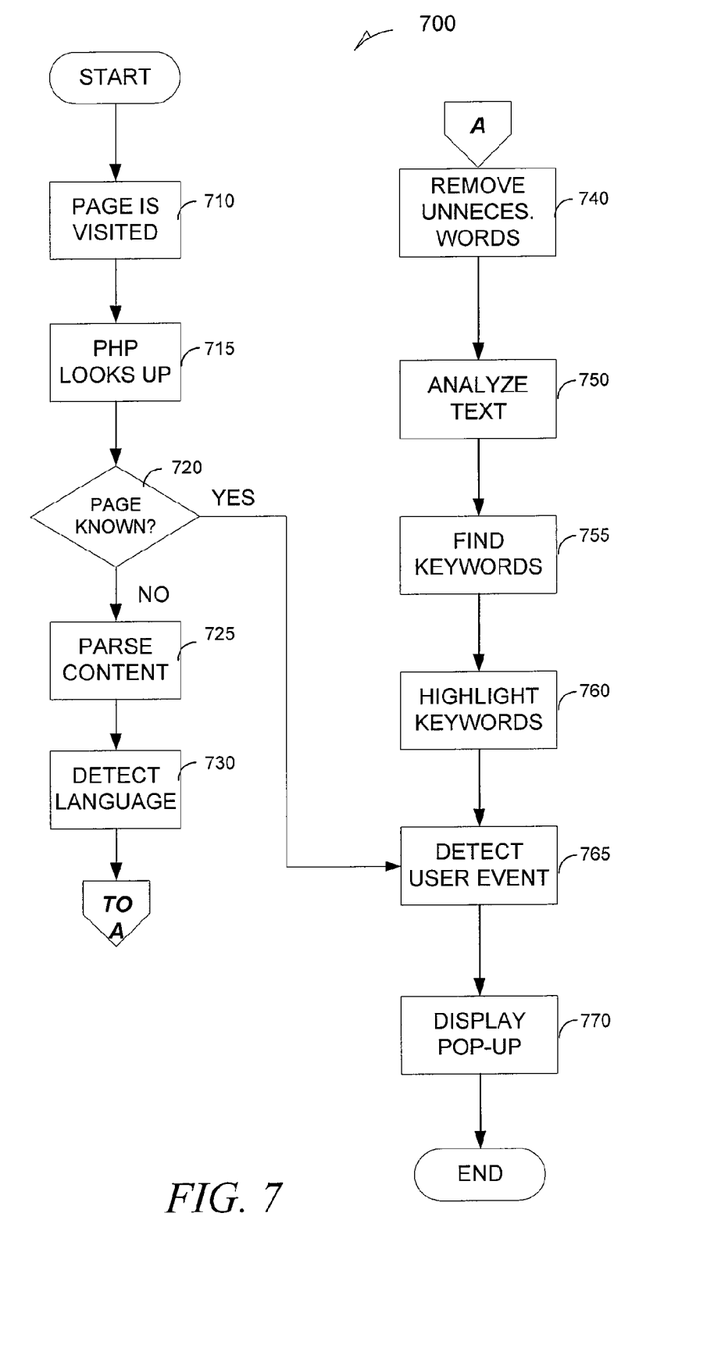
FIG. 7 is a flow diagram illustrating, in another example embodiment, a method for context-based real-time advertising.

FIG. 7 is a flow diagram illustrating, in another example embodiment, a method 700 for context-based real-time advertising. At operation 710, an online document, e.g., a Web page may be visited by a user. At operation 715, the PHP may look up the memory 460 to check whether the document is known, that is, whether the document is a known document for which the contextual-keywords, the associated listings, and the information related to the listings are already stored in the memory. In cases where, at control operation 720, it is established that the document is known, the control may be passed to operation 765 discussed below.

However, if the document is not known, at operation 725 the document may be parsed by the content analyzer 420. At operation 730, the content analyzer 420 may use the parsed content of the document to detect the language of the document. The method 700 may then continue with operation 740, where the text of the document is filtered to remove determined words. At operation 750, the filtered document may be analyzed by the content analyzer 420, as discussed above in description of FIGS. 4 and 5. At operation 755, the content analyzer 420 may finally identify the contextual-keywords of the document and, at operation 760, the contextual-keywords may be highlighted, using the JS 220. At operation 765, once a user event is detected, the user interface 450 may, at operation 770, display a tooltip (pop-up) window showing the information related to publication data (e.g., a listing or other publication) associated with the contextual-keyword that received the user event.

Figure 8:
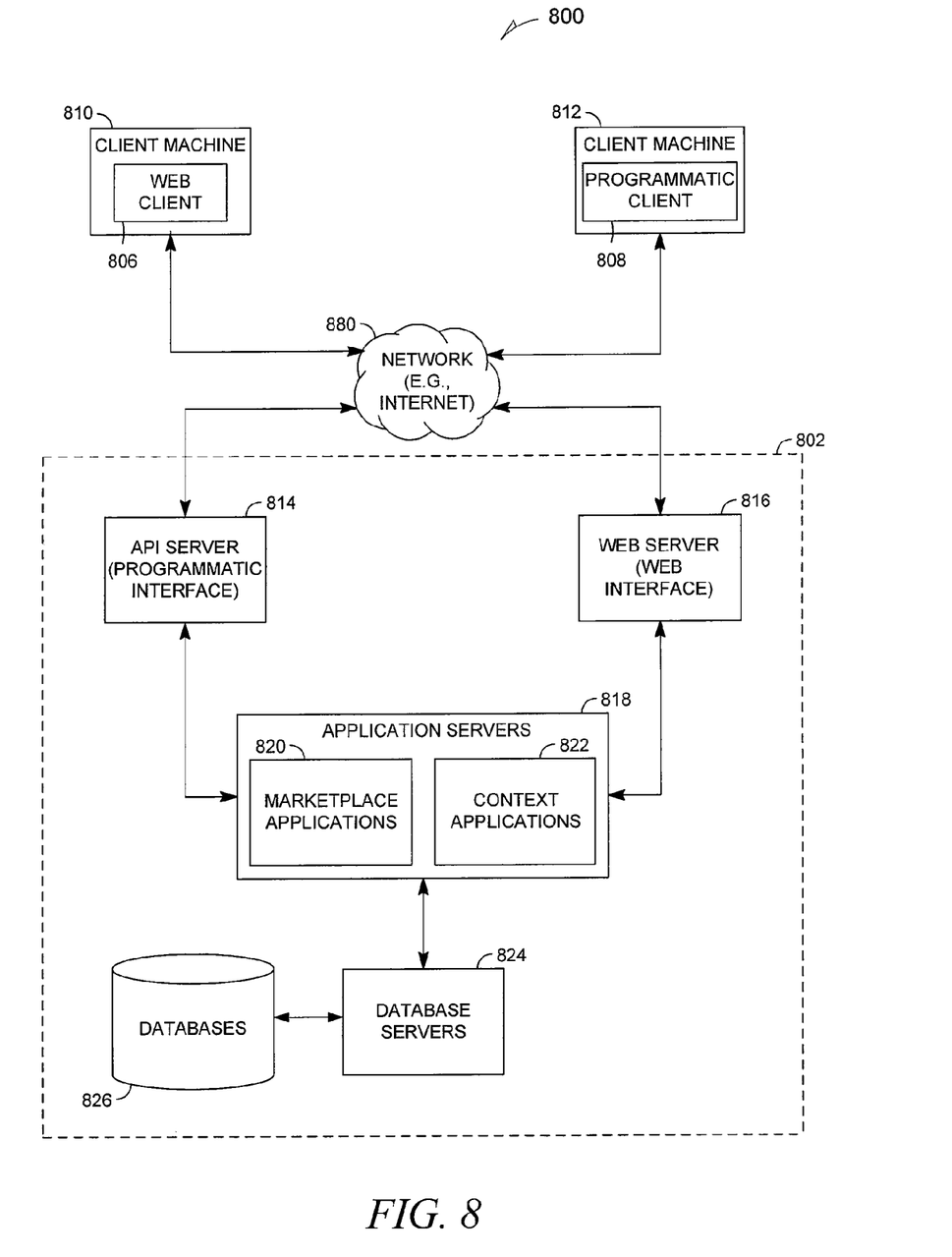
FIG. 8 is high-level block diagram illustrating an example network-based embodiment of a context-based real-time advertising system.

FIG. 8 is high-level block diagram illustrating an example network-based publication system 800, having a client-server architecture for facilitating context-based real-time advertising. The network-based publication system 800, in the example form of a network-based real-time advertising system 802, provides server-side functionality, via a network 880 (e.g., the Internet) to one or more clients. FIG. 8 illustrates, for example, a Web client 806 (e.g., a browser, such as the INTERNET EXPLORER browser developed by MICROSOFT CORPORATION of Redmond, Wash.), and a programmatic client 808 executing on respective client machines 810 and 812.

Turning to the network-based real-time advertising system 802, an Application Program Interface (API) server 814 and a Web server 816 are coupled to, and provide programmatic and Web interfaces respectively to, one or more application servers 818. The application servers 818 host one or more marketplace applications 820 and context applications 822. The application servers 818 are, in turn, shown to be coupled to one or more database servers 824 that facilitate access to one or more databases 826.

The marketplace applications 820 provide a number of marketplace functions and services to users who access the network-based real-time advertising system 802. The context applications 822 facilitate real-time context-based advertisement activities over the network 880.

Further, while the network-based publication system 800 shown in FIG. 8 employs a client-server architecture, the present application is of course not limited to such an architecture and could equally well find application in a distributed, or peer-to-peer, architecture system. The various marketplace and context applications 820 and 822 may also be implemented as standalone software programs, which do not necessarily have networking capabilities.

It should be appreciated that the Web client 806 may access the various marketplace and context applications 820 and 822 via the Web interface supported by the Web server 816. Similarly, the programmatic client 808 accesses the various services and functions provided by the marketplace and context applications 820 and 822 via the programmatic interface provided by the API server 814. The programmatic client 808 may, for example, affiliate registration applications to provide interested users (e.g., affiliates of the publication system) with affiliate program registration forms to sign up for a publication system's affiliate program.

The programmatic client 808 may also include context review applications to enable users to submit online documents, such as Web pages, for context review and keyword identification process, and communication applications to perform batch-mode communications between the programmatic client 808 and the network-based real-time advertising system 802.

Figure 9:
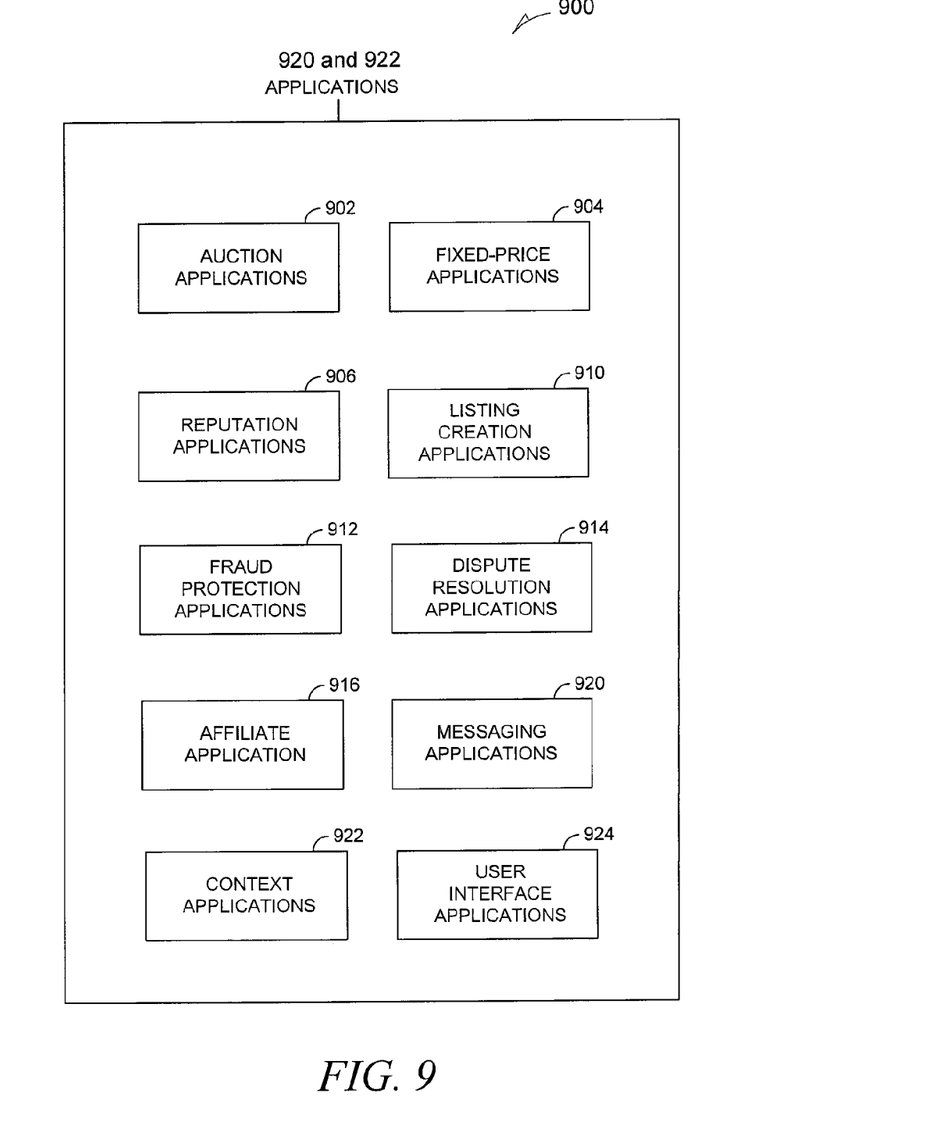
FIG. 9 shows an example set of context-based real-time advertising applications used by the network-based context-based real-time advertising system of FIG. 8.

FIG. 9 shows an example set of context-based real-time advertising applications 900 included in the applications 820 and 822 served by the application server 818 used by the network-based context-based real-time advertising system of FIG. 8. The network-based publication system 800 may provide a number of listing and price-setting mechanisms whereby a seller may list goods or services for sale, a buyer can express interest in or indicate a desire to purchase such goods or services, and a price can be set for a transaction pertaining to the goods or services. The context-based real-time advertising applications 900 are shown to include one or more auction applications 902 that support auction-format listing and price setting mechanisms (e.g., English, Dutch, Vickrey, Chinese, Double, Reverse auctions etc.).

The various auction applications 902 may also provide a number of features in support of such auction-format listings, such as a reserve price feature whereby a seller may specify a reserve price in connection with a listing and a proxy-bidding feature whereby a bidder may invoke automated proxy bidding. A number of fixed-price applications 904 support (fixed-price listing formats (e.g., the traditional classified advertisement-type listing or a catalogue listing) and buyout-type listings. Specifically, buyout-type listings (e.g., including the Buy-It-Now (BIN) technology developed by eBay of San Jose, Calif.) may be offered in conjunction with an auction-format listing and allow a buyer to purchase goods or services, which are also being offered for sale via an auction, for a fixed-price that is typically higher than the starting price of the auction.

Reputation applications 906 allow parties that transact using the network-based marketplace to establish, build, and maintain reputations, which may be made available and published to potential trading partners. Consider that where, for example, the network-based publication system 800 supports person-to-person trading, users may have no history or other reference information whereby the trustworthiness and credibility of potential trading partners may be assessed. The reputation applications 906 allow a user, for example through feedback provided by other transaction partners, to establish a reputation within the network-based publication system 800 over time. Other potential trading partners may then reference such a reputation for the purposes of assessing credibility and trustworthiness.

Listing creation applications 910 allow sellers conveniently to author listings pertaining to goods or services that they wish to transact via the marketplace. Dispute resolution applications 914 provide mechanisms whereby disputes arising between transacting parties may be resolved. For example, the dispute resolution applications 914 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 912 implement various fraud detection and prevention mechanisms to reduce the occurrence of fraud within the marketplace. Messaging applications 920 are responsible for the generation and delivery of messages to users of the network-based publication system 800, such messages for example advising users regarding the status of listings at the network-based publication system 800 (e.g., providing "outbid" notices to bidders during an auction process or to provide promotional and merchandising information to users).

The network-based real-time advertising system 802 itself, or one or more parties that may not transact via the network-based publication system 800, may operate affiliate programs that are supported by one or more affiliate applications 916. For example, an affiliate may monetize his/her Web pages or online documents by context-linking the Web pages or online documents to receive points for each user event (e.g., click or mouse over associated with a highlighted keyword/feature of the Web pages or the online document.

A number of context application 922 may facilitate for interested parties such as affiliates of the network-based publication system 800 to context-link their Web pages or online documents to listings of the network-based publication system 800. User interface applications 924 may support user interactions with the network-based publication system 800.

Example Machine Architecture

Figure 10:
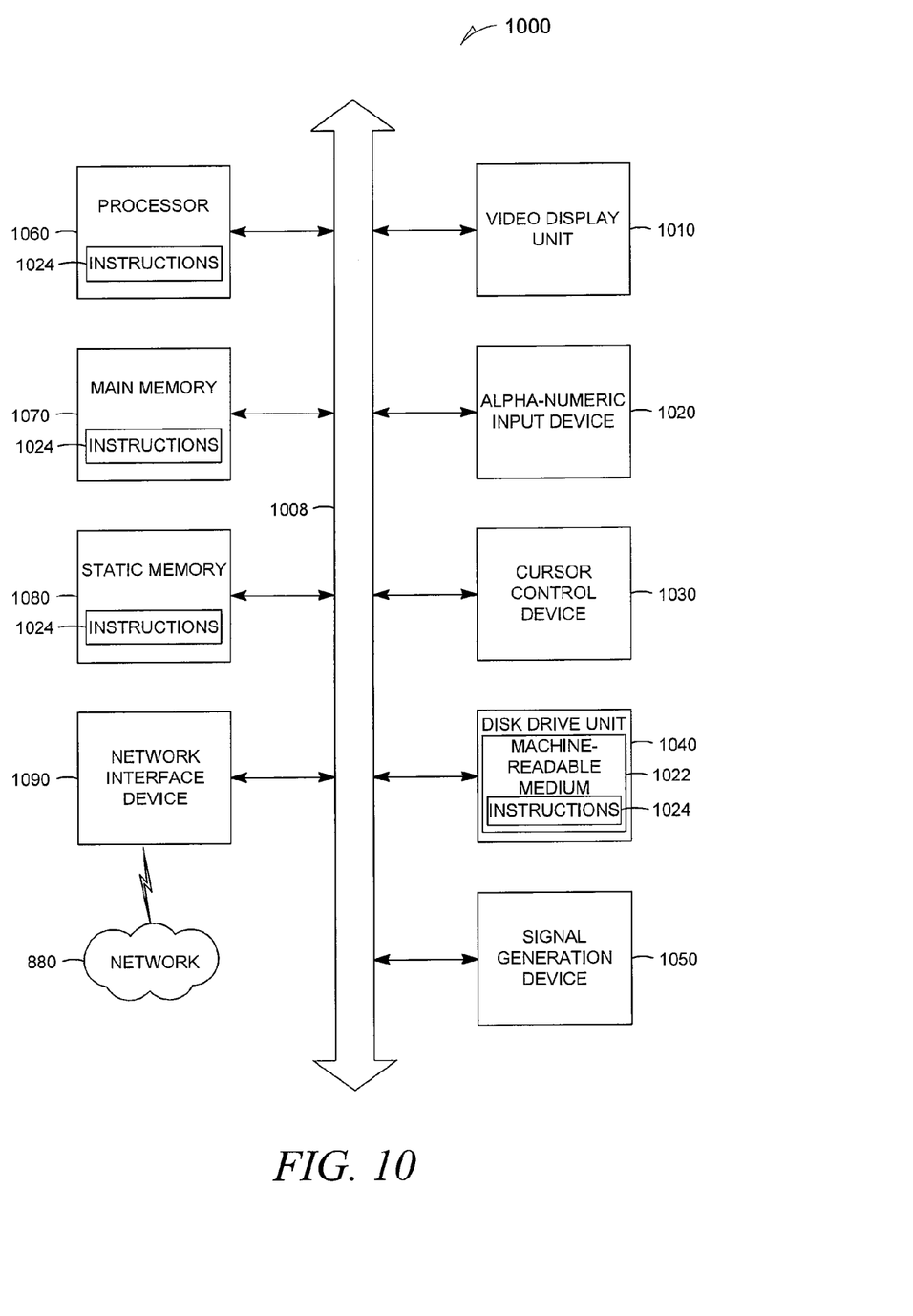
FIG. 10 is a block diagram illustrating a diagrammatic representation of a machine in the example form of a computer system.

FIG. 10 is a block diagram, illustrating a diagrammatic representation of machine 1000 in the example form of a computer system within which a set of instructions for causing the machine to perform any one or more of the methodologies discussed herein may be executed. In alternative embodiments, the machine 1000 may operate as a standalone device or may be connected e.g., networked) to other machines. In a networked deployment, the machine 1000 may operate in the capacity of a server or a client machine in a server-client network environment, or as a peer machine in a peer-to-peer (or distributed) network environment. The machine 1000 may be a server computer, a client computer, a personal computer (PC), a tablet PC, a set-top box (STB), a Personal Assistant (FDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 may include a processor 1060 (e.g., a central processing unit (CPU), a graphics processing unit (GPU) or both), a main memory 1070 and a static memory 1080, all of which communicate with each other via a bus 1008. The computer system 1000 may further include a video display unit 1010 (e.g., liquid crystal displays (LCD) or cathode ray tube (CRT). The computer system 1000 also may include an alphanumeric input device 1020 (e.g., a keyboard), a cursor control device 1030 (e.g., a mouse), a disk drive unit 1040, a signal generation device 1050 (e.g., a speaker), and a network interface device 1090.

The disk drive unit 1040 may include a machine-readable medium 1022 on which is stored one or more sets of instructions (e.g., software 1024) embodying any one or more of the methodologies or functions described herein. The software 1024 may also reside, completely or at least partially, within the main memory 1070 and/or within the processor 1060 during execution thereof by the computer system 1000, the main memory 1070 and the processor 1060 also constituting machine-readable media.

The software 1024 may further be transmitted or received over a network 880 via the network interface device 1090.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

User Interfaces

Figure 11:
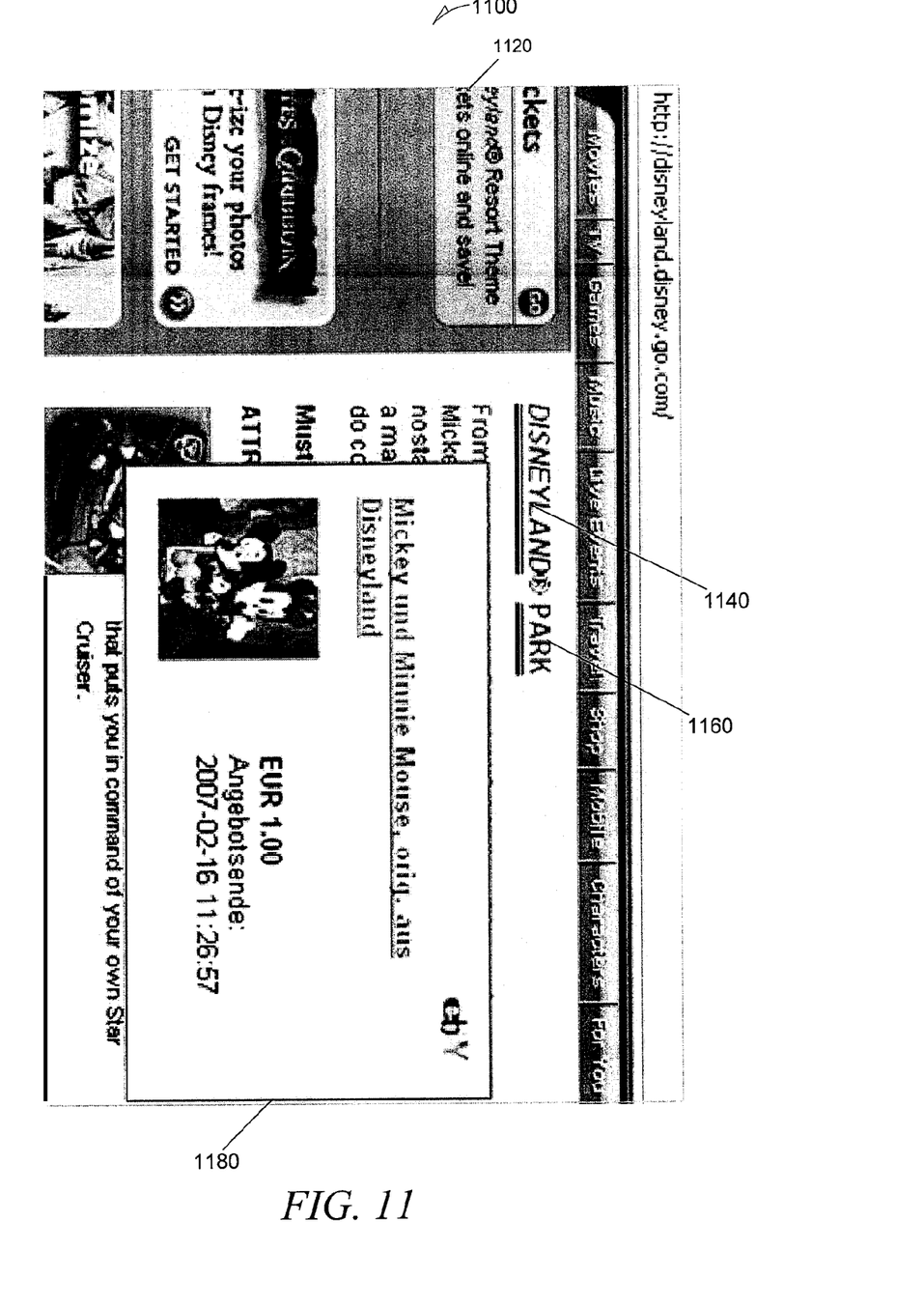
FIG. 11 shows a screenshot illustrating an example embodiment of a Web page with context-based real-time advertising.

FIG. 11 shows a screenshot illustrating an example embodiment of a Web page 1100 with context-based real-time advertising. A portion 1120 of the Web page 1100 shows the contextual-keywords 1140 and 1160. The contextual-keywords 1140 and 1160 and information related to the listings associated with these contextual-keywords are stored in the memory 460. In the example Web page shown in FIG. 11, the contextual-keyword 1140 has received a user event and as a result of the detection of such an event, the tooltip window 1180 is displayed. The displayed tooltip window 1180 may show the information related to listing e.g., Mickey und Minnie Mouse, from a publication system, e.g. EBAY INC. of San Jose, Calif. According to an example embodiment, an affiliate of a publication system may specify the language of the information displayed in the displayed tooltip window. For example, in the Web page 1100 the language of the information displayed in the tooltip window 1180 is German.

Figure 12:
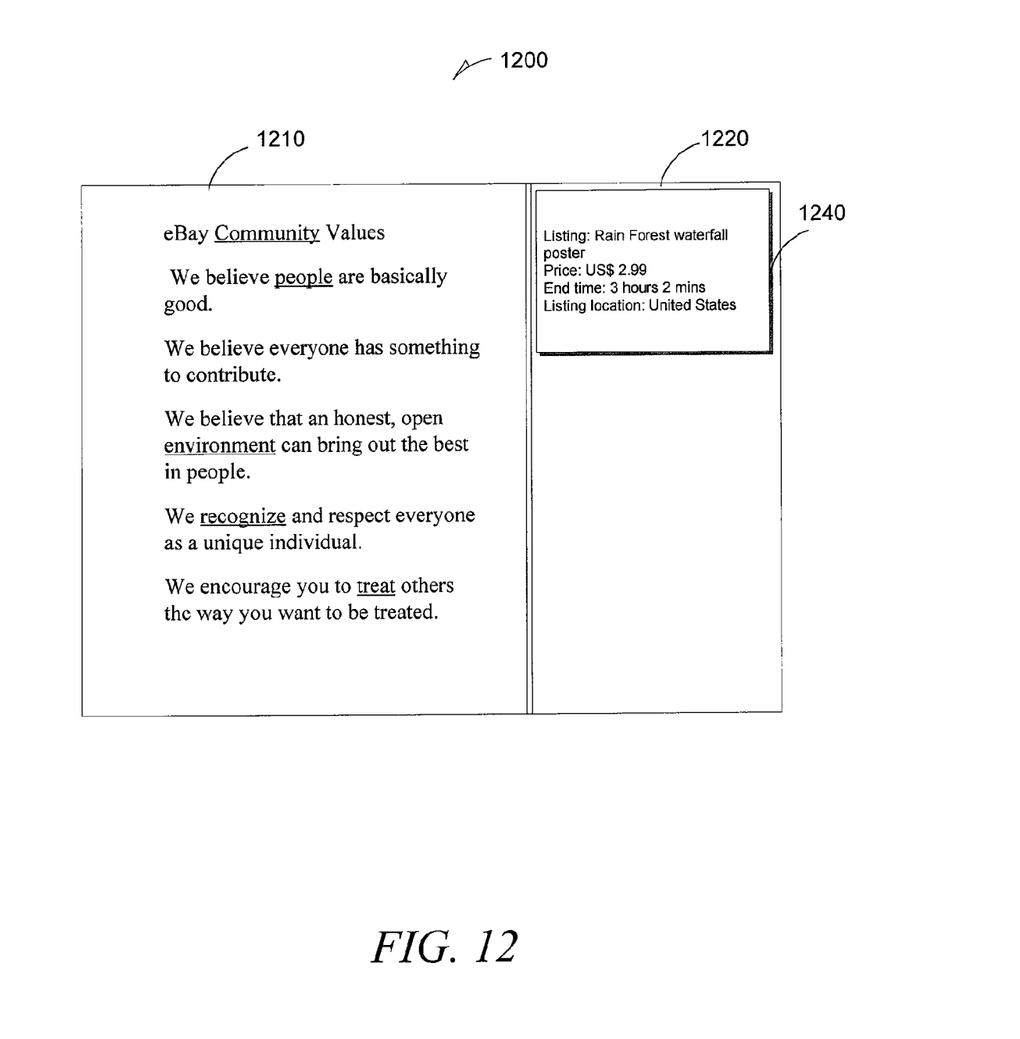
FIG. 12 shows a diagram illustrating an example embodiment of a user interface displaying a tooltip window in a dedicated section.

FIG. 12 shows a diagram illustrating an example embodiment of a user interface 1200 displaying a tooltip window in a dedicated section. In the example embodiment shown, the tooltip window 1240 may be displayed in a dedicated section 1220 of the user interface 1200. The advantage of this embodiment is that the content of the original document 1210 displayed on the user interface 1200 is not masked by the tooltip window 1220 and is entirely viewable.

Thus, a computerized method and system for context-based real-time advertising have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(h), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
displaying a document that includes a script and a program, the program, comprising of a programming language and being executable to initiate an analysis that identifies a word in the document as a contextual keyword of the document, the script, comprising of a scripting language and being executable to highlight any contextual keywords identified in the document;
by execution, at a client machine, of the program included within the document, initiating the analysis in response to the program sending a request to a server machine;
by execution, at the client machine, of the program included within the document, performing the analysis by:
  determining an occurrence frequency of the word in the document;
  determining that the word is among a group of most frequently occurring words in the document, the group of most frequently occurring words having a predefined size;
  identifying an ad category with a highest probability of containing the word based on the word being among the group of most frequently occurring words in the document;
  comparing the word in the document with words contained in the ad category; and
  identifying the word in the document as the contextual keyword of the document that is being displayed;
selecting an ad from a publication system and from a further ad category that includes the highest number of ads related to the contextual keyword of the document that is being displayed, the selecting of the ad being performed by a processor of the server machine;
by execution of the script included within the document, highlighting the word identified as the contextual keyword of the document that is being displayed;
detecting, at the client machine, a mouseover event over the word that is highlighted in the document that is being displayed; and
displaying, at the client machine, the ad within a tooltip window over the document in response to the detecting of the mouseover event over the word highlighted in the document that is being displayed.

2. The method of claim 1, wherein:
the program included within the document is further executable to determine whether any words in the document have been identified as contextual keywords of the document; the method further comprises
by execution of the program included within the document, determining that no words in the document have been identified as contextual keywords of the document; and wherein
the initiating of the analysis is based on a determination that no words in the document have been identified as contextual keywords of the document.

3. The method of claim 1, wherein:
the analysis of the document includes detecting a language of the document.

4. The method of claim 1, wherein:
the analysis of the document includes removing one or more words from the document.

5. The method of claim 1, wherein:
the identifying of the word in the document as the contextual keyword of the document is in response to a request made by an owner of the document.

6. A system comprising:
a client machine configured to:
display a document that includes a script and a program, the program being executable to initiate an analysis that identifies a word in the document as a contextual keyword of the document, the script being executable to highlight any contextual keywords identified in the document;
by executing the program included within the document, initiate the analysis in response to the program sending a request to a server machine;
by executing the program included within the document, perform the analysis by:
  determining an occurrence frequency of the word in the document;
  determining that the word is among a group of most frequently occurring words in the document, the group having a predefined size;
  identifying an ad category with a highest probability of containing the word based on the word being among the group of most frequently occurring words in the document;
  comparing the word in the document with words contained in the ad category; and identifying the word in the document as the contextual keyword of the document that is being displayed; and the server machine comprising a processor and configured to:

select an ad from a publication system and from a further ad category that includes the highest number of ads related to the contextual keyword of the document that is being displayed;

the client machine including:

an event detector configured to detect a mouseover event over the word that is highlighted in the document that is being displayed a user interface configured to display the ad within a tooltip window over the document in response to the mouseover event over the word highlighted in the document that is being displayed.

7. The system of claim 6, wherein:

the program included within the document is further executable to determine whether any words in the document have been identified as contextual keywords of the document;

the client machine is further configured to, by execution of the program included within the document, determine that no words in the document have been identified as contextual keywords of the document; and the initiating of the analysis is based on a determination that no words in the document have been identified as contextual keywords of the document.

8. The system of claim 6, wherein the client machine is configured to perform at least one of:

by executing the program included within the document, detect a language of the document, or by executing the program included within the document, remove one or more words from the document.

9. A non-transitory machine-readable medium comprising instructions that, when executed by one or more processors, cause the one or more processors to perform operations comprising:

displaying a document that includes a script and a program, the program, comprising of a programming language and being executable to initiate an analysis that identifies a word in the document as a contextual keyword of the document, the script, comprising of a scripting language and being executable to highlight any contextual keywords identified in the document;

by execution of the program included within the document, initiating the analysis in response to the displaying of the document;

by execution of the program included within the document, performing the analysis by:

determining an occurrence frequency of the word in the document;

determining that the word is among a group of most frequently occurring words in the document, the group of most frequently occurring words having a predefined size;

identifying an ad category with a highest probability of containing the word based on the word being among the group of most frequently occurring words in the document;

comparing the word in the document with words contained in the ad category;

identifying the word in the document as the contextual keyword of the document that is being displayed selecting an ad from a publication system and from a further ad category that includes the highest number of ads related to the contextual keyword of the document that is being displayed;

by execution of the script included within the document, highlighting the word identified as the contextual keyword of the document that is being displayed;

detecting a mouseover event over the word that is highlighted in the document that is being displayed; and displaying the ad within a tooltip window over the document in response to the detecting of the mouseover event over the word highlighted in the document that is being displayed.

* * * * *